(12) United States Patent
Muramatsu et al.

(10) Patent No.: US 6,690,000 B1
(45) Date of Patent: Feb. 10, 2004

(54) IMAGE SENSOR

(75) Inventors: Yoshinori Muramatsu; Susumu Kurosawa; Yasutaka Nakashiba; Tsuyoshi Nagata, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/452,596

(22) Filed: Dec. 1, 1999

(30) Foreign Application Priority Data

Dec. 2, 1998 (JP) ............................................ 10-343456

(51) Int. Cl.[7] ............................................... H01L 27/00
(52) U.S. Cl. .................. 250/208.1; 250/214 R
(58) Field of Search ................. 348/301, 308; 250/208.1, 214 R; 257/292

(56) References Cited

U.S. PATENT DOCUMENTS 5,917,547 A * 6/1999 Merrill et al. ............... 348/301
5,923,369 A * 7/1999 Merrill et al. ............... 348/301
6,111,245 A * 8/2000 Wu et al. ................. 250/208.1
6,242,728 B1 * 6/2001 Merril et al. ............. 250/208.1

OTHER PUBLICATIONS

Chi, Technologies for High Performances CMOS Active Pixel Imaging System–on–a–chip, Nov. 1998, IEEE, pp. 180–183.*

* cited by examiner

Primary Examiner—Stephone Allen
Assistant Examiner—Bradford Hill
(74) Attorney, Agent, or Firm—Choate, Hall & Stewart

(57) ABSTRACT

According to an image sensor disclosed, a pixel circuit includes a photo-diode 14 for generating a photo-electric conversion voltage which corresponds to an input optical level, a transistor 11 which is activated in response to a Reset signal RST, to initialize the photo-diode 14 from a power supply VDD, a transistor 12 which, when connected between the power supply VDD and a bit line BL, amplifies a photo-electric conversion voltage and outputs it onto the bit line BL, and a transistor 13 which is activated by a word-line readout control signal WL, to interconnect the transistor 12 and the bit line BL, in which the transistor 11 is of a depletion type.

12 Claims, 6 Drawing Sheets

IMAGE SENSOR

BACKGROUND OF THE INVENTION

1. Field of the Invention

The present invention relates to an MOS (Metal Oxide Semiconductor) type image sensor and, more particularly, to such an image sensor that uses depletion-type transistors as a group of transistors for initializing a pixel light-receiving unit.

2. Description of the Related Art

An image sensor is used in a TV camera etc. for converting into an electric signal the optical image information taken in from outside, by such a configuration that a large number of pixels are arranged in a matrix-shaped plane. An MOS-type image sensor has a photo-diode or photo-transistor as its photo-electric conversion unit and also does it comprise a pixel circuit as its peripheral circuit configured with MOS-type FETs (Field Effect Transistors), thus featuring reduced power dissipation, cost, etc. as compared to a traditional popular CCD (Charge Coupled Device).

In a conventional MOS-type image sensor, it has been quite common to use enhancement-type transistors easy to manufacture as a group of transistors for initializing a light-receiving unit in a pixel circuit.

FIG. 7 shows a configuration example 1 of a unitary pixel circuit in a conventional MOS-type image sensor, in which the pixel circuit is made of n-channel transistors. In the circuit shown in FIG. 7, when a Reset signal RST went high, a supply voltage VDD is supplied to a photo-diode 4 to reset it to a photo-electric conversion initiation state. An amplifying transistor 2, together with a current source 5, constitutes a source follower, to amplify a photo-electric conversion voltage for a photo-diode 4. A transistor 3 for outputting data onto a bit line is turned on when a word-line readout control signal WL went high, thus connecting the transistor 2 via a bit line BL to the current source. Transistors 1, 2, and 3 are of an enhancement type. The photo-diode 4 generates a photo-electric conversion voltage which corresponds to an optical input level. The current source 5, when the transistor 3 is turned on, supplies a current to the transistor 2, thus permitting it to operate as a source follower.

The following will describe the operations of the conventional MOS-type image sensor shown in FIG. 7.

In a first example of operation, the Reset signal RST activates the transistor 1 in an unexposed state to initialize the photo-diode 4 by charging it to VDD−Vt (Vt: threshold voltage of the transistor 1), then the photo-diode starts to be exposed to a light. By the photo-electric effect of the photo-diode 4 caused by an optical input, a photo-electric conversion voltage given across the photo-diode 4 corresponding to the input optical level is amplified by the transistor 2 constituting the source follower, corresponding to its transconductance gm (=I/V). After an arbitrary lapse of time, the transistor 3 is activated corresponding to the state of the word-line readout control signal WL (whereupon exposure is finished), thus providing a signal amplified at the transistor 2 onto the bit line BL.

In a second example of operation, the Reset signal RST has its potential stepped up in potential to VDD+Vt (Vt: threshold voltage of the transistor) or higher to activate the transistor 1 in order to initialize the photo-diode 4 by charging it to a voltage VDD, thus subsequently starting the exposure of the photo-diode 4. Thereafter, like in the case of the first operation example, a photo-electric voltage given across the photo-diode 4 is amplified at the transistor 2 which constitutes a source follower, so that after an arbitrary lapse of time, the transistor 3 is activated corresponding to the state of the word-line readout control signal WL (whereupon exposure is finished), thus outputting a resultant signal onto the bit line BL.

FIG. 8 shows a second configuration example 2 of a unitary pixel circuit in a conventional MOS-type image sensor, in which the circuit is made of n-channel transistors. In a circuit shown in FIG. 8, transistors 1, 2, and 3 as well as a photo-diode 4 and a current source 5 are similar to those in the configuration example 1 except that a transistor 6 is provided which constitutes a transfer gate. The transistor 6 consists of an enhancement-type transistor, which always disconnects the photo-diode 4 from a interconnection between a source of the transistor 1 and a gate of the transistor 2, except when a gate signal TG went high, whereupon the transistor 6 is turned on to connect the photo-diode to this interconnection.

The following will describe the operations of a conventional MOS-type image sensor shown in FIG. 8.

In a first example of operation, the reset signal RST activates the transistor 1 in an unexposed state and, at the same time, the gate signal TG activates the transistor 6 to initialize the photo-diode 4 by charging it to VDD−Vt (Vt: threshold voltage of the transistor 1) and then, the gate signal TG is turned off to disconnect the photo-diode 4 from the source of the transistor 1, thus starting the exposure of the photo-diode 4. After an arbitrary lapse of time, the gate signal TG activates the transistor 6 again (whereupon exposure is finished) and, by the photo-electric effect of the photo-diode 4 caused by an optical input, a photo-electric conversion voltage produced on the photo-diode 4 according to a level of the optical input is read out and written into a temporary memory 7 formed by a capacitance of the gate of the transistor 2, then the gate signal TG is turned off to disconnect the photo-diode 4 from the temporary memory 7. With this, the voltage thus held in the temporary memory 7 is amplified by the transistor constituting a source follower, corresponding to its transconductance gm (=I/V), so that by activating the transistor 3 in correspondence with the state of the word-line readout control signal WL, a signal thus amplified by the word-line readout control signal WL may be activated, to output that signal amplified by the transistor 2 onto the bit line BL.

In a second example of operation also, the Reset signal RST and the gate signal TG are stepped up in potential, in an unexposed state, to VDD+Vt (Vt: threshold voltage of the transistor 1) or higher to activate the transistors 1 and 6 in order to initialize the photo-diode 4 by charging it to a voltage VDD, then the gate signal TG is turned off to disconnect the photo-diode 4 from the gate of the transistor 1, thus starting exposure of the photo-diode 4. Subsequently, like in the case of the first example of operation, after an arbitrary lapse of time, the gate signal TG activates the transistor again (whereupon exposure is finished) and, a photo-electric conversion voltage of the photo-diode 4 is read out and written into the temporary memory 7, thus disconnecting the photo-diode 4 from the temporary memory 7. The voltage thus held in the temporary memory 7 is amplified at the transistor 2 constituting the source follower, so that the transistor 3 may be activated corresponding to the word-line readout control signal WL, thus outputting that signal amplified by the transistor 2 onto the bit line.

In a first example of configuration 1 shown in FIG. 7 and also in the case of the first example of operation, an initialization level of the photo-diode 4 drops due to the effect of the supply voltage VDD by as much as the threshold voltage of the resetting transistor 1. Therefore, such a problem occurs that a dynamic range for an output signal shrinks. In the case of the second example of operation, the Reset signal RST is raised in potential to a step-up level of VDD+Vt when the resetting transistor 1 is activated, so that a step-up power supply is required. Moreover, since the transistor 1 is provided with the step-up level of VDD+Vt, a gate oxide film, for example, must be increased in thickness, to assure a high breakdown voltage, which leads to another problem.

Furthermore, in both cases of the first and second examples of operation, if the photo-diode 4 excessively drops in voltage due to an excessive level of an optical input, a current flowing via a diffusion layer causes the peripheral diode to drop in voltage, thus giving rise to optical bleeding, so-called blooming phenomenon at peripheral images, so that to prevent this phenomenon from occurring, the resetting transistor 1 must be connected at its gate to a discharging step-down power supply in order to maintain the voltage of the photo-diode 4 at least at a constant limit, which also leads to still another problem.

In a second example of configuration shown in FIG. 8 and also in the case of the first example of operation, the photo-diode 4 drops in its initialization level due to the supply voltage VDD by as much as the threshold voltage Vt of resetting transistor 1. Therefore, such a problem occurs that a dynamic range for output signals shrinks.

Still furthermore, the Reset signal RST and the gate signal TGB are increased in potential to a step-up level VDD+Vt when the resetting transistor 1 and the gate transistor 6 are activated, so that a step-up power supply is required. Also, since the transistors 1 and 6 are provided, at their gate, with the step-up level VDD+Vt, a gate oxide film, for example, must be increased in thickness, which leads to another problem. Also, since in both the first and second examples of operation, to prevent the occurrence of the blooming phenomenon due to an excessive level of an optical input, such a countermeasure must be taken so as to connect the resetting transistor 1 and the gate transistor 6 must be connected, at their gate, to discharging step-down power supply having an appropriate lower voltage in order to maintain the voltage of the photo-diode 4 at least at a constant limit, which leads to another problem.

SUMMARY OF THE INVENTION

In view of the above, it is an object of the present invention to provide an MOS-type image sensor which can expand a dynamic range for a photo-diode output signal and also which requires no power supply to raise an initialization level for the photo-diode nor a high-breakdown voltage transistor as its resetting transistor, amplifying transistor, or gate transistor even nor a discharging step-down power supply for preventing occurrence of the blooming phenomenon.

According to a first aspect of the present invention, there is provided an image sensor having a pixel circuit which comprises a light-receiving element for generating a photo-electric conversion voltage which corresponds to an input optical level, a first transistor which is activated in response to a Reset signal, to initialize the light-receiving element from a power supply, a second transistor which, when connected between the power supply and a bit line, amplifies the photo-electric conversion voltage and outputs the voltage onto the bit line, and a third transistor which is activated by a word-line readout control signal, to interconnect the second transistor and the bit line, wherein the first transistor is a depletion-type transistor.

In the foregoing, a preferable mode is one wherein the power supply is a step-up power supply and said first transistor and said second transistor are high-breakdown voltage transistors.

Also, a preferable mode is one wherein said light-receiving element is a photo-diode.

Furthermore, an another preferable mode is one wherein said light-receiving element is a photo-transistor.

According to a second aspect of the present invention, there is provided an image sensor having a pixel circuit which comprises a light-receiving element for generating a photo-electric conversion voltage which corresponds to an input optical level, a first transistor which is activated in response to a Reset signal, to initialize said light-receiving element from a power supply, a second transistor which, when connected between said power supply and a bit line, amplifies said photo-electric conversion voltage and outputs said voltage onto said bit line, a third transistor which is activated by a word-line readout control signal, to interconnect said second transistor and a bit line, and a fourth transistor which is activated in response to a gate signal, to interconnect said first transistor and said light-receiving element, wherein said first transistor and said fourth transistor are depletion-type transistors.

In the foregoing second aspect, a preferable mode is one wherein said power supply is a step-up power supply and said first transistor, said second transistor, and said fourth transistor are high-breakdown voltage transistors.

With the above configuration, a group of transistors for initializing a pixel light-receiving unit are made of depletion-type transistors, so that the dynamic range for the photo-electric conversion voltage output of pixels can be expanded without using a step-up power supply for raising an initialization level for the pixel light-receiving unit. Furthermore, by using a step-up power supply for the initialization of the pixel light-receiving unit, it is possible to further expand the dynamic range for the photo-electric conversion output voltage.

Also, even if an excessive level of an optical input caused an excessive charge to be stored on the photo-diode of the pixel light-receiving unit, in order to prevent the occurrence of the blooming phenomenon, that charge can be drawn through the group of transistors for initialization of the pixel light-receiving unit without using any step-down power supply for driving these transistors, thus simplifying the circuit configuration.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

The following will describe the embodiments of the present invention with reference to the drawings. The description is made specifically using the embodiments.

FIRST EMBODIMENT

Figure 1:
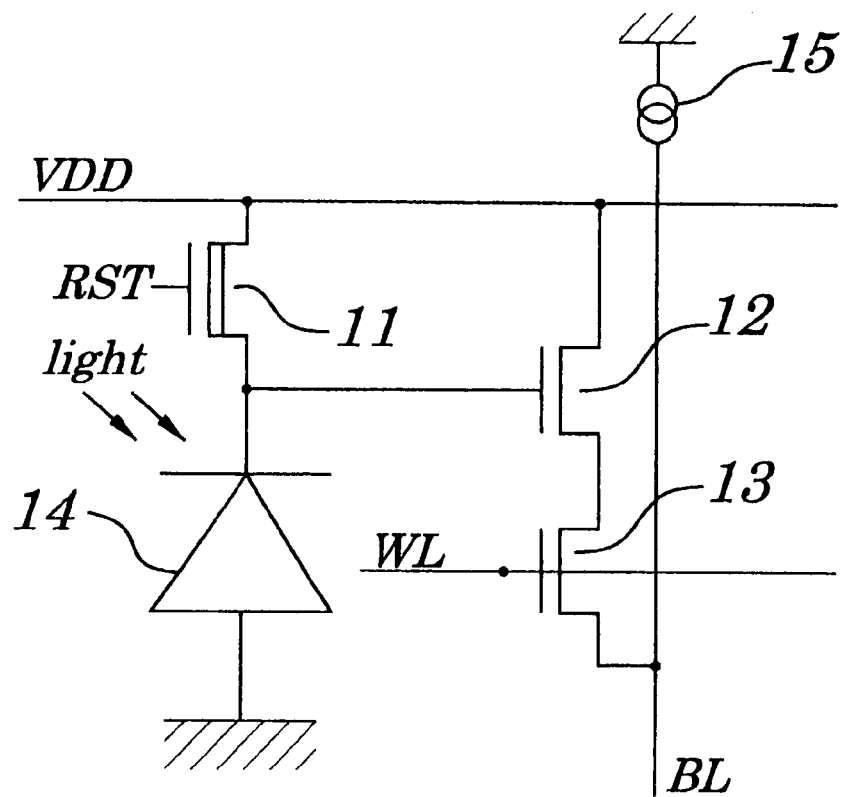
FIG. 1 is a circuit diagram showing a configuration of a pixel circuit according to a first embodiment of the present invention.

FIG. 1 shows a configuration of a unitary pixel circuit in an image sensor according to a first embodiment of the present invention, in which the pixel circuit is made of n-channel transistors. FIG. 2 shows a configuration and operations of the image sensor according to the first embodiment of the present invention.

This exemplary pixel circuit roughly comprises a resetting transistor 11, an amplifying transistor 12, a bit-line output transistor 13, a photo-diode 14, and a current source 15.

In this example, the transistors 12 and 13 are of an enhancement type, while the transistor 11 is of a depletion type.

When the Reset signal RST went high, the transistor 11 provides the supply voltage VDD to the photo-diode 14, to reset to the photo-electric conversion initiation state. The transistor 12 forms a source follower together with the current source 15, to amplify a photo-electric conversion voltage of the photo-diode 14. When the word-line readout control signal WL went high, the bit-line output transistor 13 is turned on, to connect the transistor 12 via a bit line BL to the current source 15. The photo-diode 14 generates a photo-electric conversion voltage corresponding to a level of an optical input. When the transistor 13 is in an on-state, the current source 15 in turn supplies a current to the transistor 12, to permit it to operate as a source follower.

The following will describe the operations of the pixel circuit in the image sensor of this example.

In the unexposed state, the transistor 11 is activated by the Reset signal RST, to initialize the photo-diode 14 by charging it to the supply voltage VDD, thus subsequently starting exposure of the photo-diode 14. A photo-electric conversion voltage which is produced, due to the photo-electric effect of the photo-diode 14 caused by an optical input, on the photo-diode 14 according to the optical input level is amplified by the transistor 12 consisting of the source follower corresponding to its transconductance gm (=I/V). After an arbitrary lapse of time, the transistor 13 is activated in correspondence with the word-line readout control signal WL (whereupon the exposure is finished), to output a signal thus amplified at the transistor 12 onto the bit line BL.

Figure 2B:
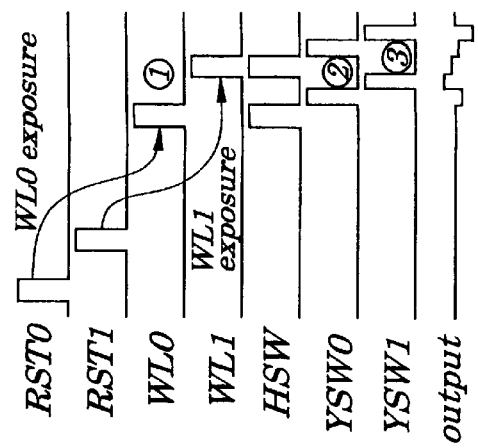
FIGS. 2A and 2B are a circuit diagram showing a configuration and signal operations of an image sensor according to the first embodiment of the present invention.
Figure 2A:
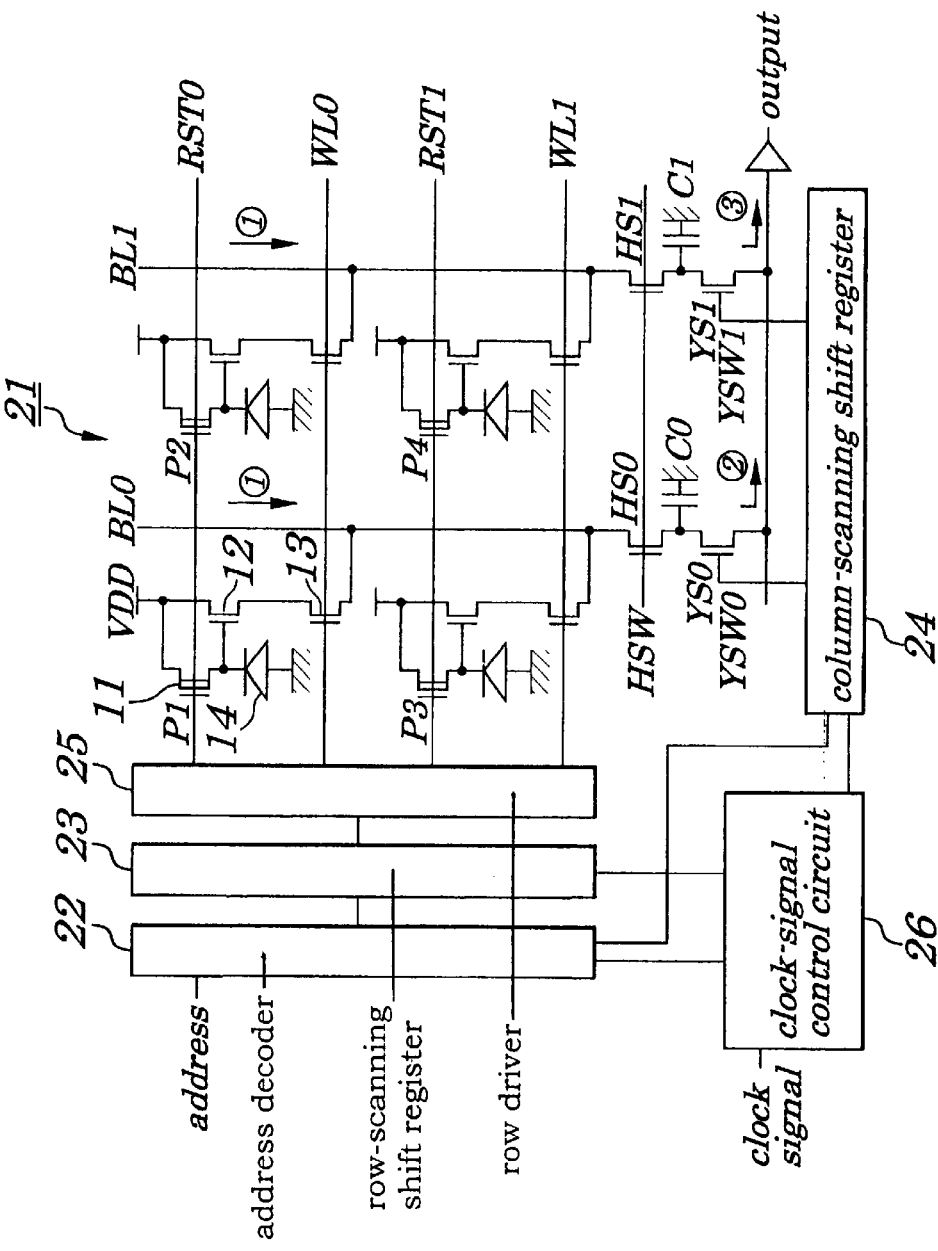

FIG. 2A shows a configuration of an image sensor which comprises a pixel array consisting of four pixel circuits P1, P2, P3, and P4 which are arranged in a 2-row×2-column array, in which a numeral 22 indicates an address decoder, a numeral 23 indicates a row-scanning shift register, a numeral 24 indicates a column-scanning shift register, a numeral 25 indicates a row driver, and a numeral 26 indicates a lock-signal control circuit.

The address decoder 22 generates, in response to an external address signal, start addresses both in vertical and horizontal directions and supplies them to the row-scanning shift register 23 and the column-scanning shift register 24. The row-scanning shift register 23 generates, in response to the clock signal, row addresses which sequentially shift from the vertical start address, to the row driver 25. The row driver in turn supplies, in response to a low address, Reset signals RST0 and RST1 as well as word-line readout control signals WL0 and WL1 all of which correspond to row addresses in the pixel array 21. The column-scanning shift register 24 generates, in response to the clock signal, column addresses which sequentially shift from the horizontal start address, to supply bit-line readout control signals YSW0 and YSW1 which correspond to column addresses in the pixel array 21. The clock-signal control circuit 26 supplies, in response to the external clock signal, desired clock signals to the address decoder 22, the row-scanning shift register 23, and the column-scanning shift register 24.

FIG. 2B is a timing chart for the operations of the image sensor shown in FIG. 2A.

At the beginning of the operation cycle, the Reset signals RST0 and RST1 are sequentially supplied from the row driver 25, to charge the photo-diode in each of the pixel circuits P1, P2, P3, and P4. Then the Reset signal is turned off, to perform exposure and, after an arbitrary lapse of time, the readout control signals WL0 and WL1 corresponding to each word line, are sequentially supplied (see FIG. 2B ①), to output a pixel's photo-electric conversion voltage amplified at the transistor 1 of the source follower via the bit-line output transistor 13 onto the bit lines BL0 and BL1. Also the horizontal readout control signal HSW is supplied, to turn on transistors HS0 and HS1, thus holding signal voltages of the bit lines BL0 and BL1 in capacitors C0 and C1 respectively. Then the horizontal readout control signal HSW is turned off to supply bitline readout control signals YSW0 and YSW1 in order to turn on transistors YS0 and YS1, thus sequentially outputting the signal voltages held in the capacitors C0 and C1 (see FIG. 2B②③).

Note here that in a circuit shown in FIG. 2A actually, operations similar to those described above are performed immediately after the photo-diode is charged in each pixel circuit, to output a photo-electric conversion voltage at the time of non-exposure, so that a photo-electric transform voltage after an exposure may be subtracted by that non-exposure photo-electric conversion voltage at an external circuit (not shown), thus conducting noise control to remove noise corresponding to a dark current flowing through the photo-diode.

An image sensor in this example employs a depletion-type transistor as the resetting transistor 11, so that upon initialization of the pixel circuit, the photo-diode 14 can be charged to a supply voltage VDD without being affected by a dark current flowing through the resetting transistor 11, thus expanding the dynamic range for photo-electric conversion voltage output.

Also, if an excessive photo-current flows through the photo-diode because of an excessive optical input level, an excess charge stored in the photo-diode can be drawn with the gate of the resetting transistor 11 held at 0V, thus eliminating the necessity of a drawing step-down power supply to prevent the occurrence of the blooming phenomenon.

SECOND EMBODIMENT

Figure 3:
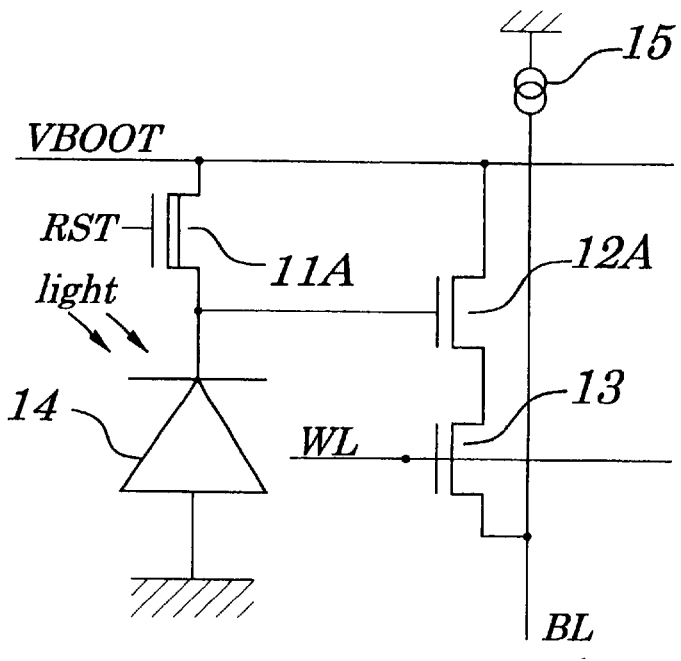
FIG. 3 is a circuit diagram showing a configuration of a pixel circuit according to a second embodiment of the present invention.

FIG. 3 shows a configuration of a unitary pixel circuit in an image sensor according to a second embodiment of the present invention, in which the circuit is made of n-channel transistors.

The pixel circuit shown in this example roughly comprises a resetting transistor 11A, an amplifying transistor 12A, a bit-line output transistor 13, a photo-diode 14, and a current source 15.

In this configuration, the transistors 12A and 13 are of an enhancement type, of which the transistor 12A is supposed to be of a high-breakdown voltage type. The transistor 11A is a depletion-type one having a high-breakdown voltage.

When the Reset signal RST went high, the transistor 11A supplies a step-up supply voltage VBOOT to the photo-diode 14, thereby resetting it to the photo-electric conversion initiation state. The transistor 12A forms a source follower together with a current source 15, thus amplifying a photo-electric conversion voltage of the photo-diode 14. When a word-line readout control signal WL went high, the bit-line output transistor 13 is turned on, to connect the transistor 12A via a bit line BL to the current source 15. The photo-diode 14 generates as photo-electric conversion voltage which corresponds to a level of an optical input. When the transistor is in an on state, the current source 15 supplies a current to the transistor 12A, to permit it to operate as the source follower.

In contrast to the first embodiment shown in FIG. 1, this exemplary pixel circuit is so configured that the photo-diode 14 may be initialized by the step-up supply voltage VBOOT, so that although high-breakdown voltage transistors are used as the resetting transistor 11A and the amplifying transistor 12A, these transistors as of the pixel circuit would operate similar to those of the first embodiment.

Since this exemplary image sensor uses a high-breakdown depletion-type transistor as the resetting transistor 11A, upon initialization of the pixel circuit, the photo-diode 14 can be charged to a level of the step-up supply voltage VBOOT without being affected by a threshold voltage of the resetting transistor 11A, thus expanding a dynamic range for the photo-electric conversion voltage output. Note here that the step-up supply voltage VBOOT is applied also to the amplifying transistor 12A, so that the transistor 12A also must be of a high-breakdown enhancement-type.

Even if an excessive level of an optical input caused an excessive photo-current to flow through the photo-diode, an excessive charge stored in the photo-diode can be drawn with the gate of the resetting transistor 11A held at a potential of 0V, no step-down power supply is required for preventing the occurrence of the blooming phenomenon.

THIRD EMBODIMENT

Figure 4:
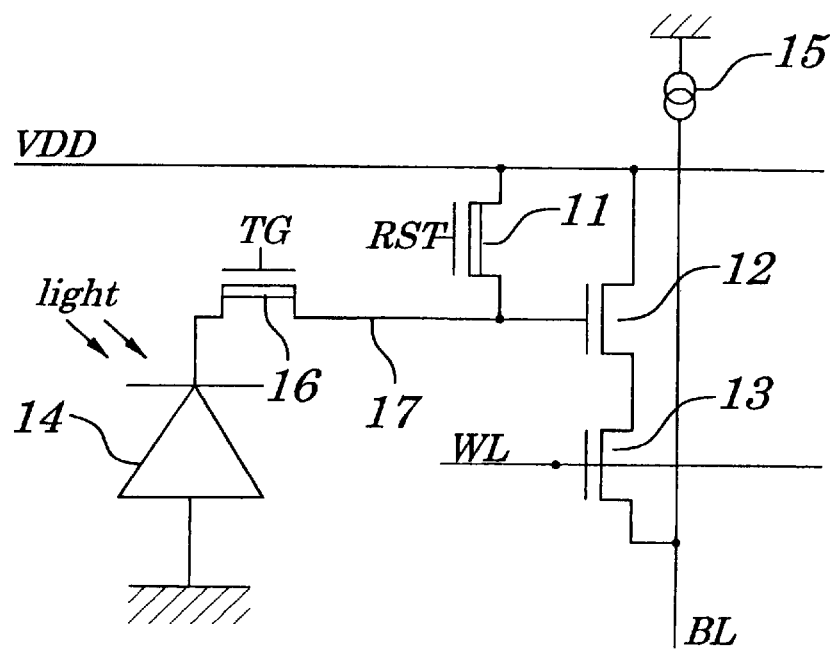
FIG. 4 is a circuit diagram showing a configuration of a pixel circuit according to a third embodiment of the present invention.

FIG. 4 shows a configuration of a unitary pixel circuit in an image sensor according to a third embodiment of the present invention, in which that circuit is made of n-channel transistors.

This exemplary pixel circuit roughly comprises a resetting transistor 11, an amplifying transistor 12, a bit-line output transistor 13, a photo-diode 14, a current source 15, and a transfer gate transistor 16. In this configuration, the transistors 12 and 13 are of an enhancement type, while the transistor 11 and 16 are of a depletion type.

In this example, the transistors 11, 12, and 13 as well as the photo-diode 14 and the current source 15 are the same as those of the first embodiment shown in FIG. 1, with a large difference that the transistor 16 constituting the transfer gate is provided in series with the photo-diode 14. Although the transistor 16 usually disconnects the photo-diode 14 from an interconnection between a source of the transistor 11 and a gate of the transistor 12, when a gate signal TG went high, it is turned on to connect the photo-diode 14 to that interconnection.

The following will describe the operations of the pixel circuit in this exemplary image sensor.

In an unexposed state, the transistor 11 is activated by the Reset signal RST and at the same time the transistor 16 is activated by the gate signal TG to initialize the photo-diode 14 by charging it to a supply voltage VDD, then the gate signal TG is turned off to disconnect the photo-diode 14 from the source of the transistor 11, so that in this disconnection state the photo-diode starts to be exposed to a light. After an arbitrary lapse of time, the transistor 16 is activated again by the gate signal TG (whereupon, the exposure is finished), to read out a photo-electric conversion voltage given on the photo-diode 14 corresponding to a level of an optical input caused by the photoelectric conversion effect based on the optical input and write that voltage into a temporary memory 17 formed by a gate capacitance of the transistor 12, so that subsequently the gate signal TG may be turned off to disconnect the photo-diode 14 from the temporary memory 17. Then, the voltage held in the temporary memory 17 is amplified by the transistor 12 constituting the source follower in correspondence with its transconductance gm (=I/V). Then, the transistor 13 is activated in response to the word-line readout control signal WL, thus outputting the signal as amplified at the transistor 12 onto the bit line BL.

Figure 5B:
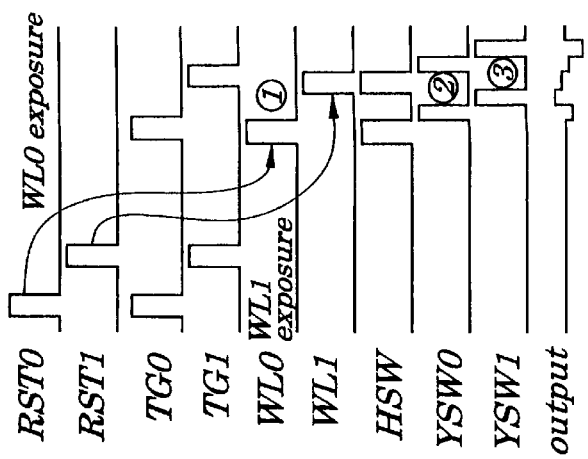
FIGS. 5A and 5B are a circuit block diagram showing a configuration and signal timing operations of an image sensor according to the third embodiment of the present invention.
Figure 5A:
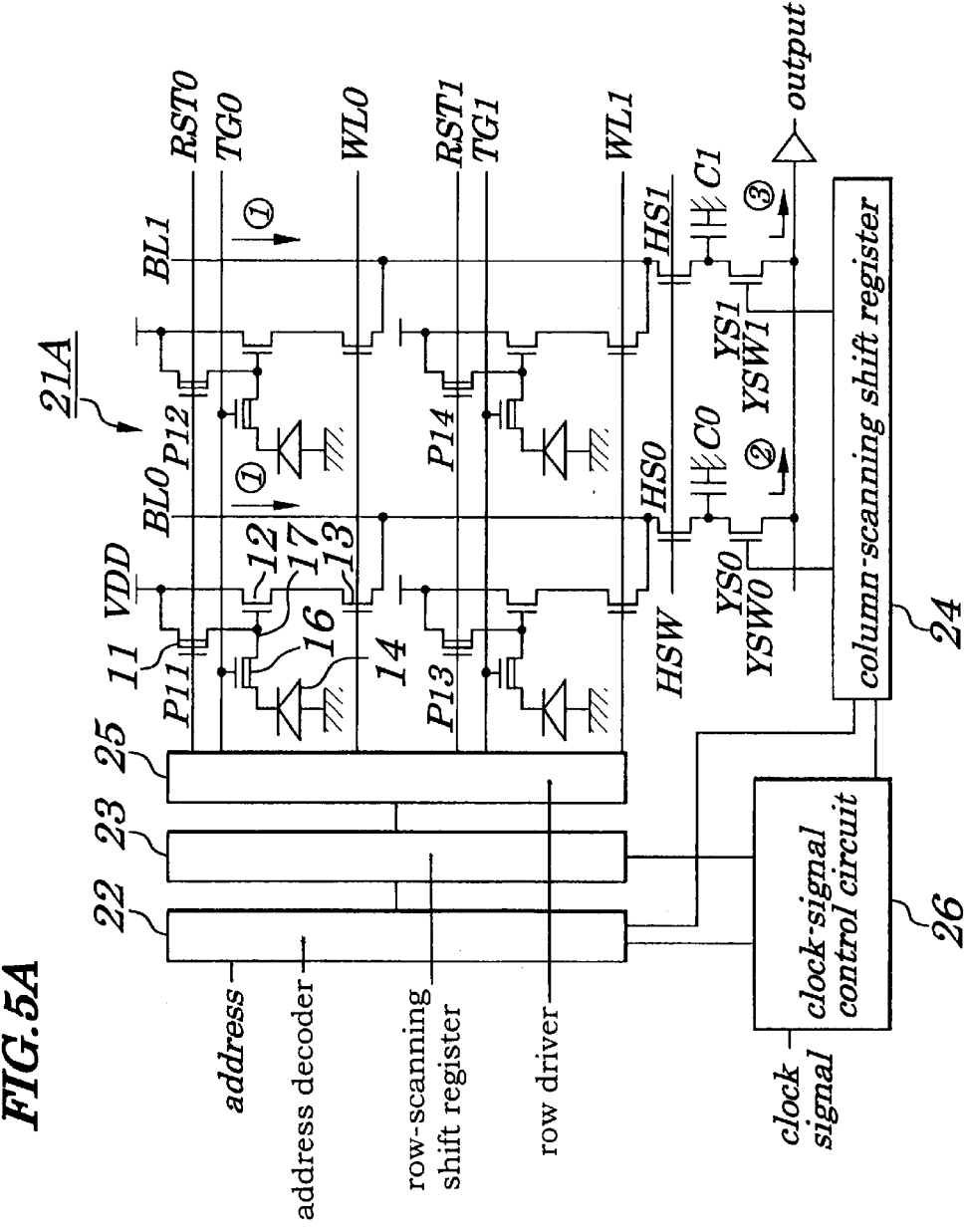

FIG. 5A shows a configuration of an image sensor having a pixel array 21 consisting of pixel circuits P11, P12, P13, and P14 arranged in a 2-row×2-column array, in which a reference numeral 22 indicates an address decoder, a reference numeral 23 indicates a row-scanning shift register, a reference numeral 24 indicates a column-scanning shift register, a reference numeral 25 a row driver, and a reference numeral 26 indicates a clock-signal control circuit.

The address decoder 22 generates, in response to an external address signal, vertical and horizontal start addresses, to supply them to the row-scanning shift register 23 and the column-scanning shift register 24. The row-scanning shift register 23 generates, in response to a clock signal, a vertical start address through sequentially shifting row addresses. The row driver 25 supplies, in response to these row addresses, Reset signals RST0 and RST1, gate signals TG0 and TG1, and word-line readout control signals WL0 and WL1, all of which correspond to row addresses in the pixel array 21. The column-scanning shift register 24 generates, in response to the clock signal, a horizontal start address through the sequentially shifting column addresses, to supply bit-line read-out control signals SW0 and SW1 which correspond to column addresses in a pixel array 21A. The clock-signal control circuit 26 supplies, in response to the external clock signal, desired clock signals to the address decoder 22, the row-scanning shift register 23, and the column-scanning shift register 24.

FIG. 5B illustrates the operations of an image sensor shown in FIG. 5A, with reference to a timing chart.

At the time of initiation of an operation cycle, the Reset signals RST0 and RS1 and the gate signals TG0 and TG1 are sequentially supplied from the row driver 25, to charge the photo-diode 14 in each of the pixel circuits P11, P12, P13, and P14. Next, The Reset signals RST0 and RST1 are turned off and then the gate signals TG1 and TG1 are once turned off to expose the photo-diode to a light and, after an arbitrary lapse of time, the gate signals TG0 and TG1 are turned on again to read out a photo-electric conversion voltage of the photo-diode 14 and write it into the temporary memory 17, to sequentially supply readout control signals WL0 and WL1 (see FIG. 5B1̂) in order to output a pixel's photo-electric conversion voltage amplified at the transistor 13 constituting the source follower via the bit-line output transistor 13 to bit lines BL0 and BL1 and, at the same time, supply a horizontal readout control signal HSW to turn on transistors HS0 and HS1, thus holding signal voltages of the bit lines BL0 and BL1 in capacitors C0 and C1 respectively. Next, a horizontal readout control signal HSW is turned off to supply bit-line readout control signals SW0 and SW1 in order to turn on transistors YS0 and YS1, thus sequentially outputting the signal voltages held in the capacitors C0 and C1 (see FIG. 5B ②, ③).

Actually, in the circuit shown in FIG. 5A, the above-mentioned operations are performed immediately after the photo-diode in each pixel circuit is charged, to output a non-exposure photo-electric conversion voltage, so that a photo-electric conversion voltage after an exposure may be subtracted by that voltage before an exposure at an external circuit (not shown), to conduct noise control specifically by removing noise corresponding to a dark current through the photo-diode.

Since in this exemplary image sensor, a depletion-type transistor is used as the resetting transistor 11 and the transfer gate transistor 16, the photo-diode 14, upon initialization of the pixel circuit, can be charged up to a level of the supply voltage VDD without being affected by the threshold voltage of the transfer gate transistor 16, thus expanding a dynamic range for the photo-electric conversion voltage.

Furthermore, in comparison to the first embodiment, at the time of exposure, since the photo-diode 14 and the temporary memory 17 in this embodiment are disconnected from each other, the photo-electric conversion efficiency is improved and also, since a photo-electric conversion voltage readout operation is performed to a bit line only after the photo-diode 14 is disconnected, the possible readout period can be prolonged.

Still furthermore, even if an excessive level of an optical input caused an excessive photo-current to flow through the photo-diode, an excessive charge stored in the photo-diode can be drawn with the gate of the resetting transistor 11 held at 0V, thus eliminating the necessity of any drawing step-down power supply for prevention of the occurrence of the blooming phenomenon.

FOURTH EMBODIMENT

Figure 6:
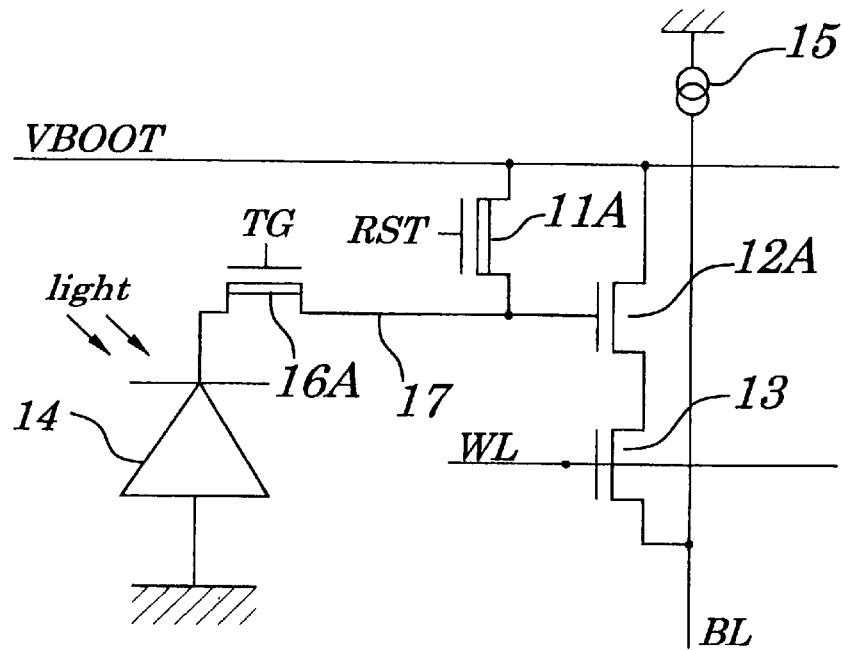
FIG. 6 is a circuit diagram showing a configuration of a pixel circuit according to a fourth embodiment of the present invention.
Figure 7:
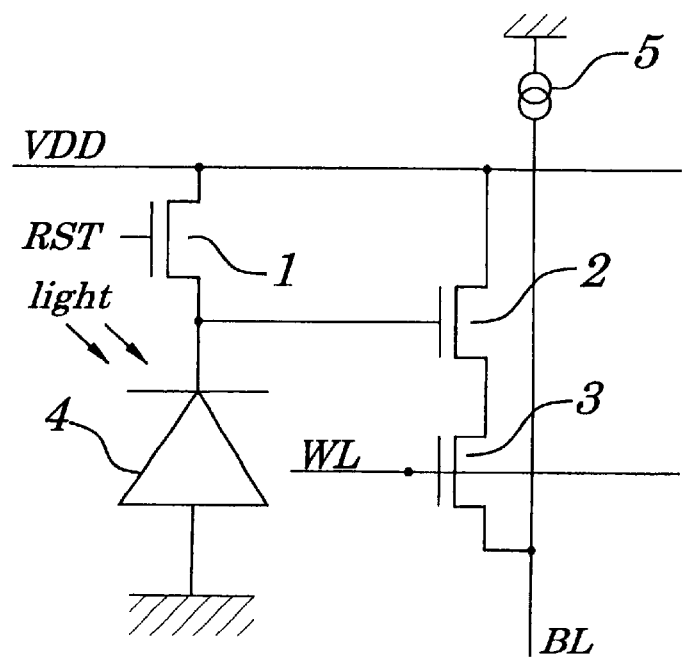
FIG. 7 is a circuit diagram showing a configuration example 1 for a pixel circuit in a conventional MOS-type image sensor.
Figure 8:
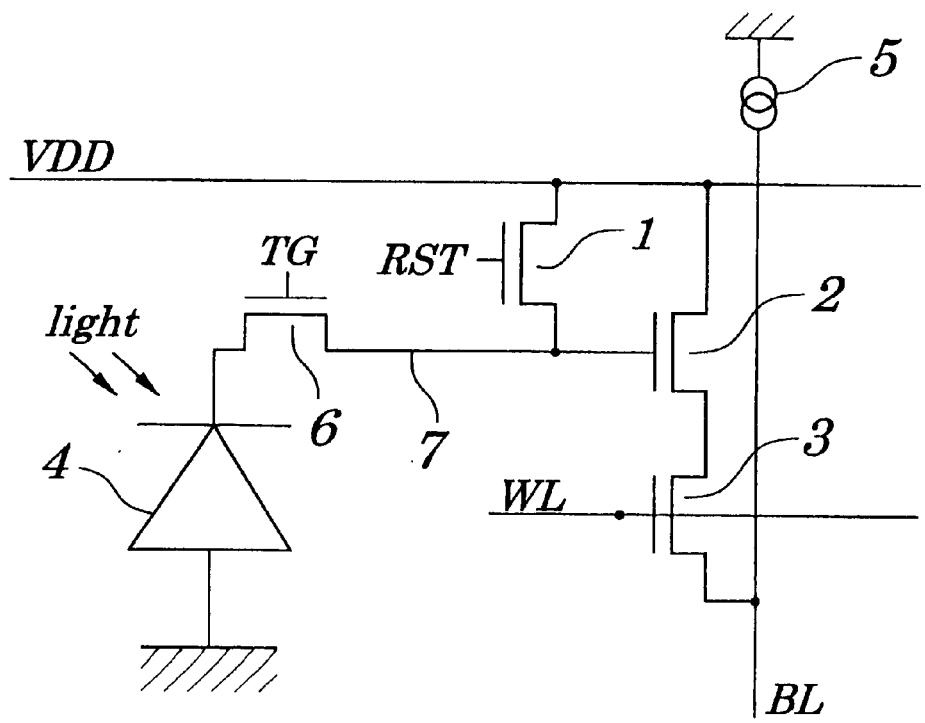
FIG. 8 is a circuit diagram showing a configuration example 2 for the pixel circuit in the conventional MOS-type image sensor.

FIG. 6 shows a configuration of a unitary pixel circuit in an image sensor according to a fourth embodiment of the present invention, in which the circuit is made of n-channel transistors.

The pixel circuit in this example roughly comprises a resetting transistor 11A, an amplifying transistor 12A, a bit-line output transistor 13, a photo-diode 14, a current source 15, and a transfer gate transistor 16A. Of these, the transistors 12A and 13 are of an enhancement type, while the transistor 12A is of a high-breakdown voltage type. The transistors 11A and 16A are depletion-type transistors having a high breakdown voltage.

When the Reset signal RST went high, the transistor 11A supplies a step-up supply voltage VBOOT to the photo-diode 14, to reset it to a photo-electric conversion initiation state. The transistor 12A forms a source follower together with the current source 15, to amplify a photo-electric conversion voltage of the photo-diode 14. When a word-line readout control signal WL went high, the bit-line output transistor 13 is turned on, to connect the transistor 12A via a bit line BL to the current source 15. The photo-diode 14 generates a photo-electric conversion voltage which corresponds to an optical input level. When the transistor 13 is in an on state, the current source 15 supplies a current to the transistor 12A, to permit it to operate as the source follower. The transistor 16A usually disconnects the photo-diode 14 from an interconnection between a source of the transistor 11A and a gate of the transistor 12A but, when a gate signal TG went high, the transistor 16A is turned on, to connect the photo-diode 14 to that interconnection.

In contrast to the third embodiment shown in FIG. 3, the pixel circuit of this example, the photo-diode 14 is so configured as to initialize the photo-diode 13 with the step-up supply voltage VBOOT, so that although a high-breakdown transistor is employed as the resetting transistor 11A, the amplifying transistor 12A, and the transfer gate transistor 16A, the pixel circuit itself would operate similar to that of the third embodiment.

Since in this example, the image sensor employs a high-breakdown depletion-type transistor as its resetting transistor 11A and the gate transistor 16A, upon initialization of the pixel circuit, the photo-diode 14 can be charged to the step-up supply voltage VBOOT without being affected by a threshold voltage of the resetting transistor 11A, thereby expanding a dynamic range for a photo-electric conversion voltage output. In this case, the amplifying transistor 12A is also provided with the step-up supply voltage VBOOT, so that is needs to be of a high-breakdown enhancement type.

In comparison to the second embodiment, at the time of exposure, the photo-diode 14 and a temporary memory 17 are disconnected from each other, thus improving the photo-electric conversion efficiency and, moreover, a readout operation of a photo-electric conversion voltage onto the bit line is performed only after the photo-diode 14 is disconnected, thus prolonging a readout enabled time.

Furthermore, if an excessive optical input level caused an excessive photo-current to flow through the photo-diode, an excessive charge stored in the photo-diode can be drawn with the gate of the resetting transistor 11A held at 0V, thereby eliminating the necessity of any drawing step-down power supply for preventing the occurrence of the blooming phenomenon.

It is apparent that the present invention is not limited to the above embodiments but may be changed and modified without departing from the scope and spirit of the invention. For example, as the transistors constituting the pixel circuit, a p-channel transistor may also be used in place of an n-channel one. Also in each pixel circuit, as the photo-electric conversion element for converting an optical input into a voltage output, a photo-transistor may be used in place of the photo-diode used in those embodiments, thus further improving the photo-electric conversion efficiency.

Finally, the present application claims the priority based on Japanese Patent Application No. Hei10-343456 filed on Dec. 2, 1998, which is herein incorporated by reference.

What is claimed is:

1. An image sensor having a pixel circuit which comprises:
   a light-receiving element for generating a photo-electric conversion voltage which corresponds to an input optical level, a first transistor disposed between said power supply and said light-receiving element, which is activated in response to a Reset signal, to initialize said light-receiving element from a power supply, a second transistor connected between said power supply and a third transistor, which responsive to a control signal from the light-receiving element, amplifies said photo-electric conversion voltage and outputs said voltage onto third transistor source region, and the third transistor disposed between said second transistor and a bit line, which is activated by a word-line readout control signal, to interconnect said second transistor and said bit line, wherein said first transistor is a depletion-type transistor and said second transistor is an enhancement type transistor.

2. The image sensor according to claim 1, wherein said power supply is a step-up power supply and said first transistor and said second transistor are high-breakdown voltage transistors.

3. The image sensor according to claim 1, wherein said light-receiving element is a photo-diode.

4. The image sensor according to claim 1, wherein said light-receiving element is a photo-transistor.

5. The image sensor according to claim 1, wherein each of said transistors is an n-channel MOS FET.

6. The image sensor according to claim 1, wherein each of said transistors is a p-channel MOS FET.

7. An image sensor having a pixel circuit which comprises:

a light-receiving element for generating a photo-electric conversion voltage which corresponds to an input optical level, a first transistor disposed between said power supply and said light-receiving element, which is activated in response to a Reset signal, to initialize said light-receiving element from a power supply, a second transistor connected between said power supply and a third transistor, which responsive to a control signal, amplifies said photo-electric conversion voltage and outputs said voltage onto the third transistor source region, the third transistor disposed between said second transistor and a bit line, which is activated by a word-line readout control signal, to interconnect said second transistor and the bit line, and a fourth transistor disposed between said second transistor and said light-receiving element, which is activated in response to a gate signal, to interconnect said first transistor and said light-receiving element, wherein said first transistor which is activated in response to a Reset signal and said fourth transistor which is activated in response to a gate signal are depletion-type transistors and said second transistor is an enhancement type transistor.

8. The image sensor according to claim 7, wherein said power supply is a step-up power supply and said first transistor, said second transistor, and said fourth transistor are high-breakdown voltage transistors.

9. The image sensor according to claim 7, wherein said light-receiving element is a photo-diode.

10. The image sensor according to claim 7, wherein said light-receiving element is a photo-transistor.

11. The image sensor according to claim 7, wherein each of said transistors is an n-channel MOS FET.

12. The image sensor according to claim 7, wherein each of said transistors is a p-channel MOS FET.

* * * * *